United States Patent
Nam et al.

(10) Patent No.: US 10,939,311 B2
(45) Date of Patent: Mar. 2, 2021

(54) INDICATION OF ADDITIONAL SYSTEM INFORMATION

(71) Applicant: QUALCOMM Incorporated, San Diego, CA (US)

(72) Inventors: Wooseok Nam, San Diego, CA (US); Tao Luo, San Diego, CA (US); Hung Dinh Ly, San Diego, CA (US); Muhammad Nazmul Islam, Edison, NJ (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 16/153,471

(22) Filed: Oct. 5, 2018

(65) Prior Publication Data

US 2019/0110217 A1   Apr. 11, 2019

Related U.S. Application Data

(60) Provisional application No. 62/569,929, filed on Oct. 9, 2017.

(51) Int. Cl.
*H04W 24/08*   (2009.01)
*H04W 72/04*   (2009.01)
(Continued)

(52) U.S. Cl.
CPC .......... *H04W 24/08* (2013.01); *H04L 5/0007* (2013.01); *H04L 5/0053* (2013.01);
(Continued)

(58) Field of Classification Search
CPC  H04W 24/08; H04W 72/044; H04W 72/0406
See application file for complete search history.

(56) References Cited

U.S. PATENT DOCUMENTS 10,469,306 B1 * 11/2019 Boles ..................... H04L 41/06
10,536,946 B2 *  1/2020 Zhu ..................... H04W 72/048
(Continued)

FOREIGN PATENT DOCUMENTS

WO    WO-2018184875 A1 * 10/2018   ........ H04W 72/1289

OTHER PUBLICATIONS

Ericsson: "Other System Information Delivery", 3GPP Draft; R1-1718713 Other System Information Delivery, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017 (Oct. 8, 2017), XP051341886, Retrieved from the Internet: URL:http://www.3gpp.org/ftp/Meetings_3GPP_SYNC/RAN1/Docs/ [retrieved on Oct. 8, 2017], 4 pages.
(Continued)

*Primary Examiner* — Rasheed Gidado
(74) *Attorney, Agent, or Firm* — Holland & Hart LLP

(57) ABSTRACT

Methods, systems, and devices for wireless communications are described for dynamically configuring a schedule and a set of transmission resources for delivering additional system information. A first type of system information, such as remaining minimum system information (RMSI), may include configuration information indicative of the dynamically-configured schedule and set of transmission resources for delivering the additional system information, such as other system information (OSI). The dynamically-configured set of transmission resources for delivering the additional system information may be a control resource set (CORESET), and control information within the CORESET may be encoded with a radio network temporary identifier that is the same as or different than the first set of system information.

20 Claims, 13 Drawing Sheets

(51) Int. Cl.
    *H04L 5/00* (2006.01)
    *H04W 48/12* (2009.01)
(52) U.S. Cl.
    CPC ........... *H04L 5/0091* (2013.01); *H04W 48/12* (2013.01); *H04W 72/044* (2013.01); *H04W 72/0406* (2013.01)

(56) References Cited

U.S. PATENT DOCUMENTS

| | | | | |
|---|---|---|---|---|
| 2006/0286986 | A1* | 12/2006 | Kim | H04W 16/04 455/450 |
| 2010/0260113 | A1* | 10/2010 | Liu | H04B 7/15542 370/329 |
| 2013/0089008 | A1* | 4/2013 | Li | H01Q 1/246 370/277 |
| 2016/0135176 | A1* | 5/2016 | Wong | H04W 4/70 370/329 |
| 2016/0278125 | A1* | 9/2016 | Liao | H04W 24/00 |
| 2018/0110062 | A1* | 4/2018 | Byun | H04W 72/14 |
| 2018/0279289 | A1* | 9/2018 | Islam | H04L 5/0094 |

OTHER PUBLICATIONS

International Search Report and Written Opinion—PCT/US2018/054868—ISA/EPO—dated Jan. 24, 2019.
LG Electronics: "Other System Information Delivery", 3GPP Draft; R1-1717928 LG_OSI_FINAL, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017 (Oct. 8, 2017), XP051341112, Retrieved from the Internet: URL:http://www.3gpp.org/ftp/Meetings_3GPP_SYNC/RAN1/Docs/ [retrieved on Oct. 8, 2017], 2 pages.
Mediatek Inc: "Further Discussion on OSI Delivery", 3GPP Draft; R1-1718331_Further Discussion on OSI Delivery, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051341514, Retrieved from the Internet: URL:http://www.3gpp.org/ftp/Meetings_3GPP_SYNC/RAN1/Docs/ [retrieved on Oct. 8, 2017], 3 pages.
Nokia et al., "On Other System Information Delivery", 3GPP Draft; R1-1718614, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017 (Oct. 8, 2017), XP051341788, Retrieved from the Internet: URL:http://www.3gpp.org/ftp/Meetings_3GPP_SYNC/RAN1/Docs/ [retrieved on Oct. 8, 2017], 4 pages.

* cited by examiner

INDICATION OF ADDITIONAL SYSTEM INFORMATION

CROSS REFERENCES

The present Application for Patent claims the benefit of U.S. Provisional Patent Application No. 62/569,929 by NAM et al., entitled "INDICATION OF ADDITIONAL SYSTEM INFORMATION," filed Oct. 9, 2017, assigned to the assignee hereof, and expressly incorporated herein.

BACKGROUND

The following relates generally to wireless communication, and more specifically to indication of additional system information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications, a base station may wirelessly transmit system information to enable other devices to establish wireless communications with the base station. Different aspects of system information may be transmitted separately. Techniques for efficiently transmitting different aspects of system information may be desired.

SUMMARY

The described techniques relate to improved methods, systems, devices, or apparatuses that support indication of additional system information. Generally, the described techniques provide for dynamically configuring transmission resources for delivery of control information associated with various aspects of system information, which may beneficially improve the flexibility and efficiency with which a base station may transmit (e.g., broadcast) system information.

A method of wireless communication is described. The method may include receiving a first set of system information, the first set of system information includes configuration information associated with a second set of system information, identifying, based at least in part on the configuration information, one or more temporal windows during which to monitor for control information associated with the second set of system information, identifying, based at least in part on the configuration information, a set of dynamically-configured transmission resources within the identified one or more temporal windows to monitor for the control information associated with the second set of system information, and monitoring the identified set of transmission resources during at least one identified temporal window.

An apparatus for wireless communication is described. The apparatus may include means for receiving a first set of system information, the first set of system information includes configuration information associated with a second set of system information, means for identifying, based at least in part on the configuration information, one or more temporal windows during which to monitor for control information associated with the second set of system information, means for identifying, based at least in part on the configuration information, a set of dynamically-configured transmission resources within the identified one or more temporal windows to monitor for the control information associated with the second set of system information, and means for monitoring the identified set of transmission resources during at least one identified temporal window.

Another apparatus for wireless communication is described. The apparatus may include a processor, memory in electronic communication with the processor, and instructions stored in the memory. The instructions may be operable to cause the processor to receive a first set of system information, the first set of system information includes configuration information associated with a second set of system information, identify, based at least in part on the configuration information, one or more temporal windows during which to monitor for control information associated with the second set of system information, identify, based at least in part on the configuration information, a set of dynamically-configured transmission resources within the identified one or more temporal windows to monitor for the control information associated with the second set of system information, and monitor the identified set of transmission resources during at least one identified temporal window.

A non-transitory computer-readable medium for wireless communication is described. The non-transitory computer-readable medium may include instructions operable to cause a processor to receive a first set of system information, the first set of system information includes configuration information associated with a second set of system information, identify, based at least in part on the configuration information, one or more temporal windows during which to monitor for control information associated with the second set of system information, identify, based at least in part on the configuration information, a set of dynamically-configured transmission resources within the identified one or more temporal windows to monitor for the control information associated with the second set of system information, and monitor the identified set of transmission resources during at least one identified temporal window.

Some examples of the method, apparatus, and non-transitory computer-readable medium described herein may further include processes, features, means, or instructions for receiving the control information associated with the second set of system information via the identified set of transmission resources. Some examples of the method, apparatus, and non-transitory computer-readable medium described herein may further include processes, features, means, or instructions for receiving the second set of system information via a transmission resource indicated by the identified the control information.

In some examples of the method, apparatus, and non-transitory computer-readable medium described herein, identifying, based at least in part on the configuration information, the set of dynamically-configured transmission resources to monitor for control information associated with the second set of system information comprises: identifying a control resource set (CORESET), a search space set, or a combination thereof corresponding to the second set of system information.

In some examples of the method, apparatus, and non-transitory computer-readable medium described herein, monitoring the identified set of transmission resources during the at least one identified temporal window comprises: monitoring a search space set associated with the CORESET for control information corresponding to the second set of system information.

In some examples of the method, apparatus, and non-transitory computer-readable medium described herein, monitoring the identified set of transmission resources during the at least one identified temporal window comprises: determining whether control information received via the identified set of transmission resources may have been encoded at least in part with a radio network temporary identifier (RNTI) corresponding to the second set of system information.

In some examples of the method, apparatus, and non-transitory computer-readable medium described herein, the configuration information indicates a beam index associated with the set of transmission resources, a frame index associated with the set of transmission resources, a subframe index associated with the set of transmission resources, a symbol index associated with the set of transmission resources, a frequency band associated with the set of transmission resources, an RNTI associated with the set of transmission resources, or any combination thereof.

In some examples of the method, apparatus, and non-transitory computer-readable medium described herein, the RNTI associated with the set of transmission resources may be different than another RNTI associated with the first set of system information.

In some examples of the method, apparatus, and non-transitory computer-readable medium described herein, the RNTI associated with the set of transmission resources may be also associated with the first set of system information.

In some examples of the method, apparatus, and non-transitory computer-readable medium described herein, the second set of system information comprises other system information (OSI) data.

In some examples of the method, apparatus, and non-transitory computer-readable medium described herein, the first set of system information comprises remaining minimum system information (RMSI) data.

A method of wireless communication is described. The method may include determining one or more temporal windows for transmitting control information for a second set of system information, determining a set of dynamically-configured transmission resources for transmitting the control information for the second set of system information during the one or more temporal windows, and transmitting a first set of system information, the first set of system information includes configuration information indicative of the one or more temporal windows and of the set of dynamically-configured transmission resources.

An apparatus for wireless communication is described. The apparatus may include means for determining one or more temporal windows for transmitting control information for a second set of system information, means for determining a set of dynamically-configured transmission resources for transmitting the control information for the second set of system information during the one or more temporal windows, and means for transmitting a first set of system information, the first set of system information includes configuration information indicative of the one or more temporal windows and of the set of dynamically-configured transmission resources.

Another apparatus for wireless communication is described. The apparatus may include a processor, memory in electronic communication with the processor, and instructions stored in the memory. The instructions may be operable to cause the processor to determine one or more temporal windows for transmitting control information for a second set of system information, determine a set of dynamically-configured transmission resources for transmitting the control information for the second set of system information during the one or more temporal windows, and transmit a first set of system information, the first set of system information includes configuration information indicative of the one or more temporal windows and of the set of dynamically-configured transmission resources.

A non-transitory computer-readable medium for wireless communication is described. The non-transitory computer-readable medium may include instructions operable to cause a processor to determine one or more temporal windows for transmitting control information for a second set of system information, determine a set of dynamically-configured transmission resources for transmitting the control information for the second set of system information during the one or more temporal windows, and transmit a first set of system information, the first set of system information includes configuration information indicative of the one or more temporal windows and of the set of dynamically-configured transmission resources.

In some examples of the method, apparatus, and non-transitory computer-readable medium described herein, determining the set of dynamically-configured transmission resources for transmitting the control information for the second set of system information during the one or more temporal windows comprises: determining a CORESET, a search space set, or a combination thereof corresponding to the second set of system information.

In some examples of the method, apparatus, and non-transitory computer-readable medium described herein, determining the set of dynamically-configured transmission resources for transmitting the control information for the second set of system information during the one or more temporal windows comprises: determining a slot index associated with the second set of system information, the slot index different than another slot index associated with the first set of system information.

In some examples of the method, apparatus, and non-transitory computer-readable medium described herein, determining the set of dynamically-configured transmission resources for transmitting the control information for the second set of system information during the one or more temporal windows comprises: determining a slot index associated with the second set of system information, the slot index also associated with the first set of system information. Some examples of the method, apparatus, and non-transitory computer-readable medium described herein may further include processes, features, means, or instructions for determining a symbol index associated with the second set of system information, the symbol index different than another symbol index associated with the first set of system information.

In some examples of the method, apparatus, and non-transitory computer-readable medium described herein, determining the set of dynamically-configured transmission resources for transmitting the control information for the second set of system information during the one or more temporal windows comprises: determining a slot index associated with the second set of system information, the slot index also associated with the first set of system information. Some examples of the method, apparatus, and non-transitory computer-readable medium described herein may further include processes, features, means, or instructions for determining a symbol index associated with the second set of system information, the symbol index also associated with the first set of system information. Some examples of the method, apparatus, and non-transitory computer-readable medium described herein may further include processes, features, means, or instructions for determining a frequency band associated with the second set of system information, the frequency band different than another frequency band associated with the first set of system information.

In some examples of the method, apparatus, and non-transitory computer-readable medium described herein, the frequency band partially overlaps with the another frequency band.

Some examples of the method, apparatus, and non-transitory computer-readable medium described herein may further include processes, features, means, or instructions for assigning an RNTI to the first set of system information, the RNTI different than another RNTI associated with the second set of system information.

Some examples of the method, apparatus, and non-transitory computer-readable medium described herein may further include processes, features, means, or instructions for assigning a same RNTI to the first set of system information and to the second set of system information.

In some examples of the method, apparatus, and non-transitory computer-readable medium described herein, determining the one or more temporal windows for transmitting the second set of system information comprises: determining a time duration for each of the one or more temporal windows. Some examples of the method, apparatus, and non-transitory computer-readable medium described herein may further include processes, features, means, or instructions for determining a periodicity for the one or more temporal windows. Some examples of the method, apparatus, and non-transitory computer-readable medium described herein may further include processes, features, means, or instructions for determining an initial symbol index for each of the one or more temporal windows.

DETAILED DESCRIPTION

Figure 1:
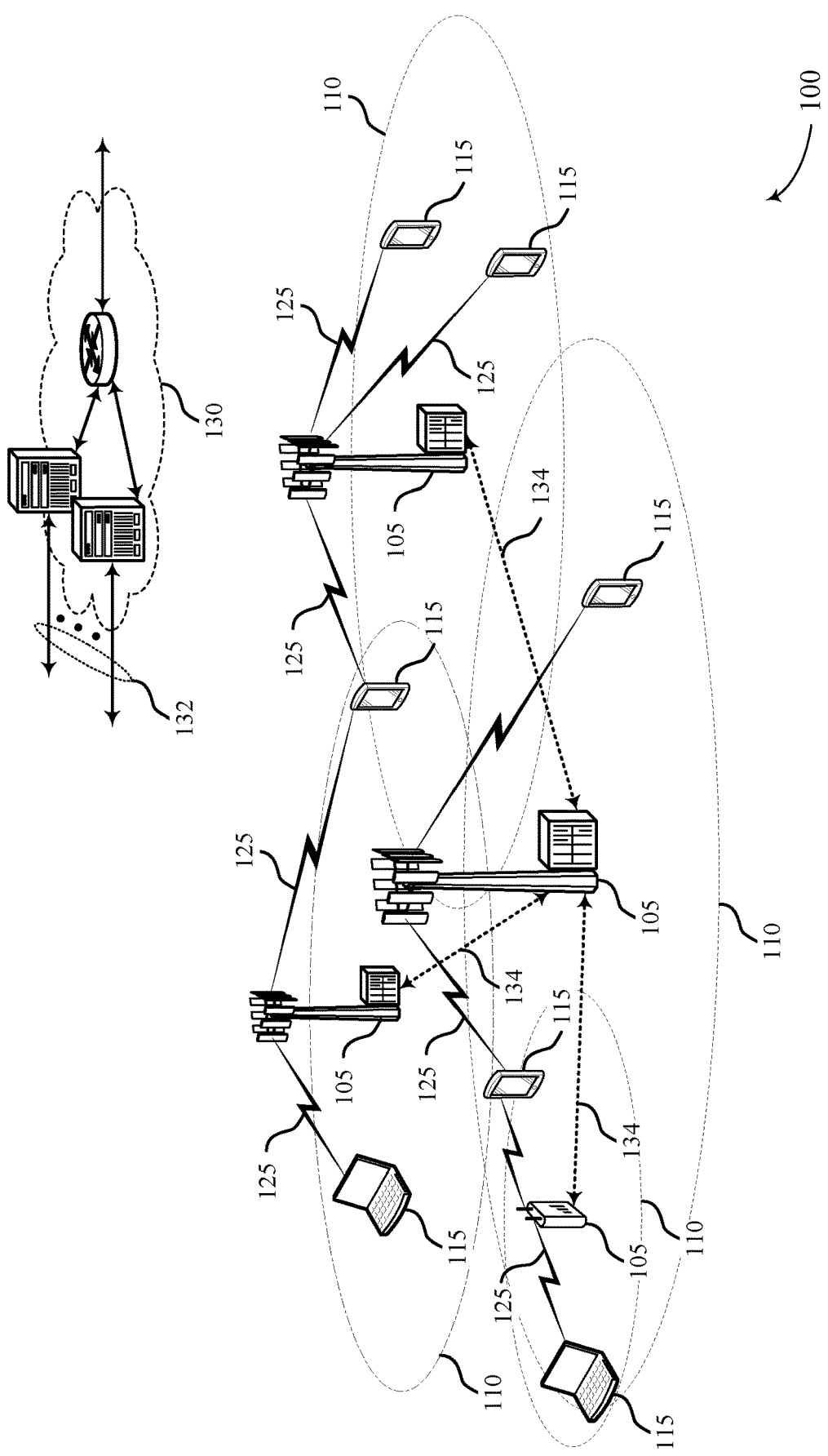
FIG. 1 illustrates an example of a system for wireless communications that supports an indication of additional system information in accordance with aspects of the present disclosure.

To establish communication with a network, a device such as a user equipment (UE) or base station may first receive synchronization information for a cell of the network along with other operational information about the cell. Aside from synchronization, the information necessary for a device to properly establish wireless communications within the cell may be referred to as system information. Within a cell, a base station may regularly transmit (e.g., broadcast) system information so as to enable other devices that enter the cell to establish wireless communications with the base station.

In some cases, a base station may transmit different sets of system information at different times and using different transmission resources. The different sets of system information may comprise different types of system information, and a UE may use the different sets of system information for different purposes. Further, some of the sets of system information may be used by only some UEs. Thus, transmitting all sets of system information in the same manner (e.g., equally often or using a same amount or set of transmission resources) may be inefficient with respect to device and system resources such as power, time, frequency, code, spatial, or spectrum resources. Further, statically configuring the times and transmission resources for transmitting all sets of system information may unduly constrain the operation of scheduling algorithms with a wireless communications system, which may introduce further inefficiency with respect to device and system resources such as power, time, frequency, code, spatial, or spectrum resources.

From both a system perspective and a device perspective, resource efficiency and scheduling flexibility may be improved by dynamically configuring the schedule and transmission resources for delivery of at least some sets of system information. A UE may receive a first set of system information, which may be transmitted according to a preconfigured schedule and using preconfigured transmission resources—e.g., according to a standardized schedule and using standardized transmission resources—and may use data included within the first set of system information to identify dynamically-configured transmission resources that the UE may monitor for additional system information. The first set of system information may in some cases comprise a type of system information utilized by additional UEs (e.g., all UEs) or for more fundamental purposes (e.g., establishing an initial communication link with a base station) as compared to the additional system information.

Dynamically configuring the schedule and transmission resources for delivery of additional system information may include dynamically configuring control resources (e.g., transmission resources for the transmission of downlink control information), and the dynamically-configured control resources may indicate other transmission resources used to deliver the additional system information. Thus, after receiving the first set of system information, the UE may use data included within the first set of system information to identify dynamically-configured control resources (e.g., a dynamically-configured control resource set (CORESET)), and the UE may monitor the dynamically-configured control resources and receive the additional system information via transmission resources that are dynamically scheduled and indicated via the dynamically-configured control resources. The use of dynamically-configured control resources—as opposed to, e.g., statically-configured control resources such as a statically-configured control region of a downlink transmission time interval (TTI)—may further improve the efficiency with which a base station may transmit additional system information (e.g., by avoiding transmitting the additional system information unnecessarily) and the flexibility with which the base station may schedule the transmission of additional system information, thus conserving device and system resources such as power, time, frequency, code, spatial, or spectrum resources.

Aspects of the disclosure are initially described in the context of a wireless communications system. Further examples are then provided that illustrate a variety of transmission schemes for the efficient delivery of additional system information, along with corresponding receiver-side systems and methods. Aspects of the disclosure are further illustrated by and described with reference to apparatus diagrams, system diagrams, and flowcharts that relate to the efficient delivery of additional system information.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. In some cases base stations 105 and UEs 115 may support techniques for efficiently transmitting and receiving different types of system information.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In order to establish communication with a wireless communications system, such as wireless communications system 100, a device such as a UE 115 or base station 105 may first need to receive system information for an existing cell within the network. System information may comprise any information, other than synchronization information, that is necessary for a device necessary to properly establish communications within the cell. Thus, a base station within the cell may transmit system information on a periodic basis, or alternatively transmit some amount of system information on a periodic basis and additional system information on an on-demand basis or on a periodic basis with sparser, less frequent periodicity.

Synchronization information may be transmitted as part of a primary synchronization signal (PSS). A PSS may be a sequence transmitted within a cell by a base station 105 on a periodic basis and may allow a target device to achieve synchronization at a slot or TTI level of granularity. A PSS may also include some information regarding the cell's identity (e.g., the cell's identity within a larger group of cell identities, thus reducing the number of possible identities for the cell), along with information that may enable the target device to locate and receive a secondary synchronization signal (SSS). In some cases, the PSS may be based on Zadoff-Chu (ZC) sequences or m-sequences.

The base station 105 may also transmit the SSS on a periodic basis, and it may allow a target device to achieve synchronization at a less granular temporal level, such as at a frame level. In some cases, the base station may transmit multiple SSSs (e.g., two SSSs) within a single frame according to a pattern such that, from receiving a single SSS and identifying its place in the pattern, the target device may determine frame timing. An SSS sequence may be based on maximum length sequences, known as M-sequences, and may be constructed by interleaving, in the frequency-domain, two length-31 Binary Phase Shift Keying (BPSK)-modulated sequences. The two underlying length-31 sequences may themselves be two different cyclic shifts of a single length-31 M-sequence. The cyclic shift indices of the M-sequences may be derived from a function of a physical layer cell identity group that includes the cell's identity. Thus, the target device may be able to derive the applicable cell identity group from the SSS and, combined with the identity information that the target device may have obtained from the PSS, thereby determine the cell's complete cell identity.

In some cases, the base station 105 may separately transmit different sets of system information, which may include different types of system formation. For example, in an NR or 5G communications system, the base station may separately transmit minimum system information (MSI), remaining minimum system information (RMSI), and other system information (OSI). Collectively, MSI and RMSI may comprise a limited amount of information that is essential for a UE 115 to initially access the network, and thus a base station 105 may transmit (e.g., broadcast) MSI and RMSI data in a preconfigured (e.g., standardized) fashion known a priori to the UE 115. The base station 105 also may transmit the MSI and RMSI data more frequently than OSI. For example, MSI and RMSI may include information regarding downlink system bandwidth (e.g., in terms of RBs), the resources allocated to hybrid automatic repeat request (HARQ) acknowledgement signaling in the downlink (e.g., configuration data for a physical HARQ indicator channel (PHICH)), as well as a System Frame Number (SFN). OSI may include any type of system information not included in MSI or RMSI.

Because the base station 105 may transmit different sets of system information at different times and using different transmission resources, the base station 105 and the UE 115 may conserve device and system resources such as power, time frequency, code, spatial, or spectrum resources. In other words, UEs 115 need not be configured to monitor different communication resources for different sets of system information, and thus waste resources. Rather UEs 115 may identify resources carrying a second set of system information based at least in part on the first set of system information received in resources in which the UE 115 is configured to monitor or receive system information.

Figure 2:
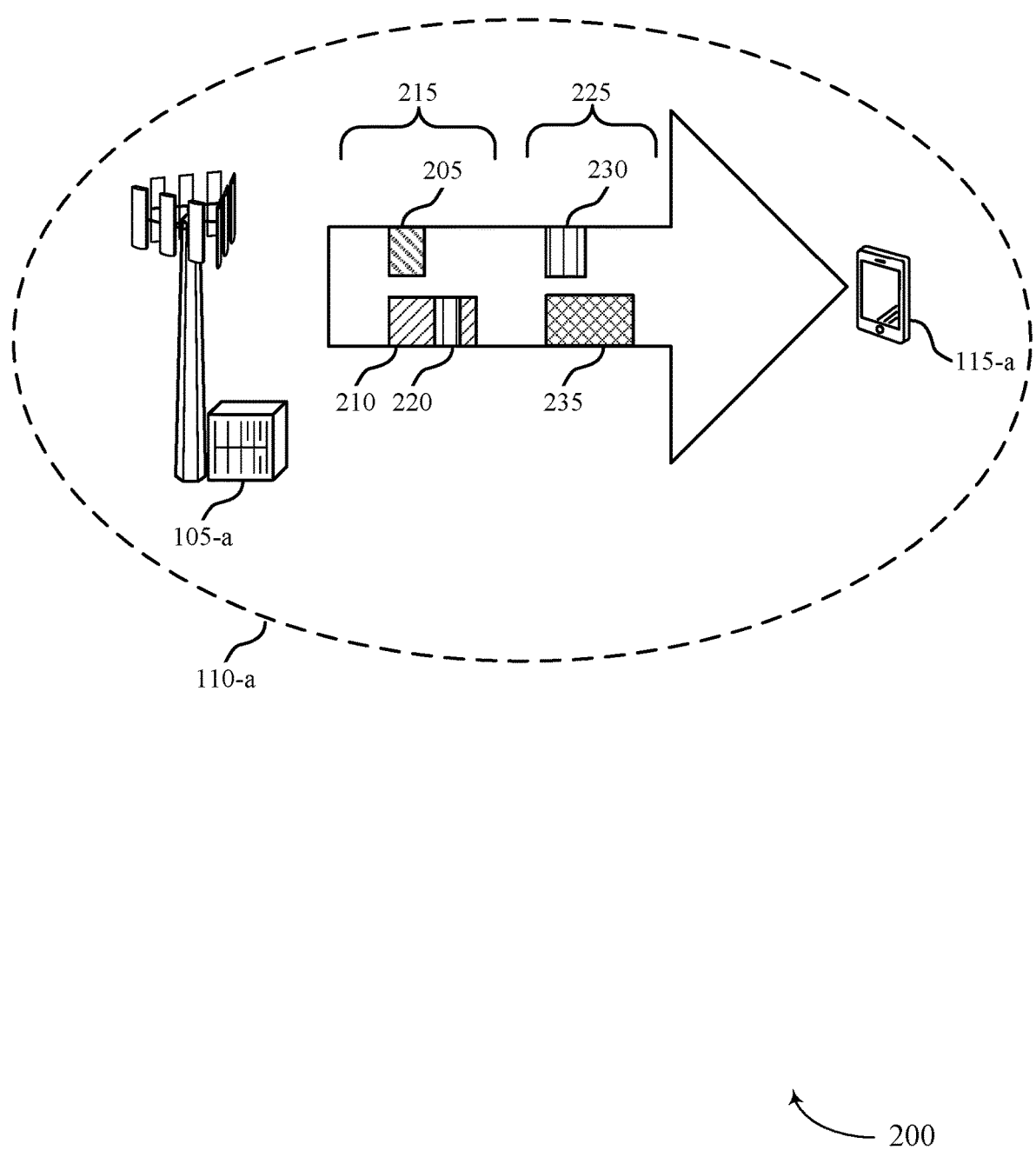
FIG. 2 illustrates an example of a system for wireless communications that supports an indication of additional system information in accordance with aspects of the present disclosure.

FIG. 2 illustrates an example of a wireless communications system 200 that supports an indication of additional system information in accordance with various aspects of the present disclosure. In some examples, wireless communications system 200 may be implemented by aspects of wireless communication system 100. In the example of FIG. 2, the wireless communications system 200 may include a first base station 105-a, which may be an examples of a base station 105 of FIG. 1, and a first UE 115-a, which may be an example of a UE 115 of FIG. 1.

In the example of FIG. 2, the first base station 105-a may have a first geographic coverage area 110-a and may support transmissions within the first geographic coverage area 110-a. The first UE 115-a may be located within the first geographic coverage area 110-a.

The first base station 105-a may transmit (e.g., broadcast) a first set of system information 210. In some examples, the first base station 105-a may transmit the first set of system information 210 in a preconfigured (e.g., standardized) manner. For example, the first base station 105-a may transmit the first set of system information 210 within preconfigured windows of time, which may be referred to as first monitoring windows 215. The first monitoring windows 215 may each have a preconfigured temporal duration and occur with a preconfigured periodicity. Using numbers for the sake of clarity only, for example, the first monitoring windows 215 may each have a preconfigured temporal duration of 10 milliseconds and the first base station 105-*a* may transmit a first monitoring window 215 every 100 milliseconds.

The first base station 105-*a* may transmit first control information 205, which may be associated with the first set of system information 210, during first monitoring windows 215 using preconfigured transmission resources (e.g., using one or more symbols having preconfigured symbol index, slot index, or other timing, within a preconfigured frequency band, and encoded using a radio network temporary identifier (RNTI) associated with the first set of system information 210). The transmission resources via which the first base station 105-*a* transmits first control information 205 may include a preconfigured CORESET or via an otherwise preconfigured set of transmission resources for downlink control signaling (e.g., a preconfigured search space or other physical downlink control channel (PDCCH) resource, which may in some cases be included within the preconfigured CORESET).

The first UE 115-*a* may be configured—either by the first base station 105-*a* or a priori (e.g., due to standardization)—to monitor the preconfigured transmission resources associated with the first set of system information 210 during one or more first monitoring windows 215. Once the first UE 115-*a* identifies first control information 205 within a first monitoring window 215, the first UE 115-*a* may cease monitoring the preconfigured transmission resources associated with the first set of system information 210 during subsequent first monitoring windows 215.

The first UE 115-*a* may identify first control information 205 based on an RNTI associated with the first set of system information 210. For example, the first UE 115-*a* may monitor the transmission resources that may carry first control information 205 by attempting to decode all or a subset (e.g., an error detection code portion, such as a cyclic redundancy check (CRC) portion) of a PDCCH resource within the monitored transmission resources using, at least in part, the RNTI associated with the first set of system information 210. Upon a successful decode, the first UE 115-*a* may determine that the PDCCH resource is associated with the first set of system information 210 and comprises first control information 205. First control information 205 may indicate one or more downlink data transmission resources (e.g., physical downlink shared channel (PDSCH) resources), and the first UE 115-*a* may identify the indicated downlink data transmission resources and receive the first set of system information 210 via the indicated downlink data transmission resources.

Thus, in some examples, first monitoring windows 215 and the transmission resources that may carry first control information 205 may be preconfigured. But the first base station 105-*a* may dynamically schedule, during a first monitoring windows 215, by transmitting first control information 205 and thus the first set of system information 210. Within first monitoring windows 215, the first base station 105-*a* may, in some cases, dynamically schedule first control information 205 and the first set of system information 210 on the basis of slots or other time intervals (e.g., on the basis of some number of OFDM symbols, such as 2, 4, or 7 OFDM symbols.

The first set of system information 210 may include configuration information 220. Configuration information 220 may indicate when the first UE 115-*a* is to monitor for a second set of system information 235. For example, configuration information may indicate a schedule according to which the first base station 105-*a* may transmit the second set of system information 235. The first base station 105-*a* may dynamically determine the schedule. For example, the schedule may comprise one or more second monitoring windows 225, and first base station 105-*a* may dynamically determine the duration, periodicity, and starting time (e.g., initial symbol index or slot index) of the second monitoring windows 225. Thus, second monitoring windows 225 may be dynamically configured by first base station 105-*a*, which may be in contrast, for example, to first monitoring windows 215, which may instead be preconfigured (e.g., standardized).

Configuration information 220 may also indicate a set of transmission resources via which the first base station 105-*a* may transmit second control information 230. For example, configuration information 220 may indicate beam information (e.g., a beam index), frequency information (e.g., a frequency band), a frame index, a subframe index, a symbol index, an RNTI, or any combination thereof associated with second control information 230. Thus, the set of transmission resources via which the first base station 105-*a* may transmit second control information 230 may be dynamically configured by first base station 105-*a*, which may be in contrast, for example, to the transmission resources via which the first base station 105-*a* may transmit first control information 205, which may instead be preconfigured (e.g., standardized)

The dynamically-configured set of transmission resources via which the first base station 105-*a* may transmit second control information 230 may comprise a dynamically-configured CORESET or other dynamically-configured set of transmission resources for downlink control signaling (e.g., a preconfigured search space or other physical downlink control channel (PDCCH) resource, which may in some cases be included within the dynamically-configured CORESET).

The first UE 115-*a* may identify the dynamically-configured attributes of second monitoring windows 225 and the dynamically configured transmission resources via which the first base station 105-*a* may transmit second control information 230 based at least in part on configuration information 220. The first UE 115-*a* may monitor the dynamically configured transmission resources via which the first base station 105-*a* may transmit second control information 230 during one or more second monitoring windows 225. In some cases, the first base station 105-*a* may skip some second monitoring windows 225 and transmit second control information 230 during only some second monitoring windows 225. Once the first UE 115-*a* identifies second control information 230 within a second monitoring window 225, the first UE 115-*a* may cease monitoring the associated dynamically-configured transmission resources during subsequent second monitoring windows 225.

The first UE 115-*a* may identify second control information 230 based on an RNTI associated with the second set of system information 235. For example, the first UE 115-*a* may monitor the dynamically-configured transmission resources via which the first base station 105-*a* may transmit second control information 230 by attempting to decode all or a subset (e.g., an error detection code portion, such as a CRC portion) of a PDCCH resource within the monitored transmission resources (e.g., within the CORESET) using, at least in part, the RNTI associated with the second set of system information 235. Upon a successful decode of a PDCCH resource, the first UE 115-*a* may determine that the PDCCH resource is associated with the second set of system information 235 and comprises second control information 230. Second control information 230 may indicate one or more downlink data transmission resources (e.g., PDSCH resources), and the first UE 115-a may identify the indicated downlink data transmission resources and receive the second set of system information 235 via the indicated downlink data transmission resources.

In some cases, the first base station 105-a may assign the same RNTI to both the first set of system information 210 and the second set of system information 235. In one such example, the first base station 105-a may dynamically configure the transmission resources that may carry second control information 230 such that they do not temporally overlap (e.g., do not have the same slot index, or have the same slot index but not the same symbol index) with the preconfigured transmission resources that may carry first control information 205—by virtue of such time multiplexing, the first UE 115-a may be able to unambiguously identify whether control information that the first base station 105-a has encoded with the shared RNTI corresponds to the first set of system information 210 or the second set of system information 235 based at least in part on the timing of the control information.

As another example, the first base station 105-a assigns the same RNTI to both the first set of system information 210 and the second set of system information 235 but may dynamically configure the transmission resources that may carry second control information 230 such that they utilize different frequency bands or transmission beams than the preconfigured transmission resources that may carry first control information 205. By virtue of such frequency or spatial multiplexing, the first UE 115-a may be able to unambiguously identify whether control information that the first base station 105-a has encoded with the shared RNTI corresponds to the first set of system information 210 or the second set of system information 235 based at least in part on the frequency or beam carrying the control information. In some cases, the first base station 105-a may assign the same RNTI to both the first set of system information 210 and the second set of system information 235, and the dynamically-configured transmission resources that may carry second control information 230 may partially overlap in frequency with the preconfigured transmission resources that may carry first control information 205, but the first UE 115-a may be able to unambiguously identify whether control information that the first base station 105-a has encoded with the shared RNTI corresponds to the first set of system information 210 or the second set of system information 235 based at least in part on the low-end or high-end of the frequency band carrying the control information— e.g., the two frequency bands may partially overlap, but the low-ends and high-ends of the two frequency bands remain unique. In some examples, the first base station 105-a may employ a combination of time-multiplexing, frequency-multiplexing, spatial multiplexing, or partial frequency-multiplexing techniques, either using different multiplexing techniques for different sets of additional system information or for the same set of additional system information at different times. Such flexibility in dynamically configurations may enable the base station 105-a to improve device and system resource efficiency, including in the RNTI domain.

In some cases, the first base station 105-a may assign a first RNTI to the first set of system information 210 and a second, different RNTI to the second set of system information 235. The first base station 105-a may thus encode first control information 205 with the first RNTI and second control information 230 with the second RNTI. In such cases, the dynamically-configured transmission resources that may carry second control information 230 may be referred to as a dedicated control resource (e.g., a dedicated CORESET or a dedicated search space set) in that the control resource is dedicated to the second control information 230 and thus also to the second set of system information 235.

In some cases, wireless communications system 200 may be a 5G or NR system, and the first set of system information 210 may include MSI or RMSI. The RNTI associated with the first set of system information 210 may in some cases be a system information RNTI (SI-RNTI). The second set of system information 235 may include OSI, and, as explained herein, the RNTI associated with the second set of system information 235 may be the SI-RNTI associated with the first set of system information 210 or a different RNTI unique to OSI.

Because UE 115 may be configured to receive information during the first monitoring window 215 and because the first monitoring window 215 may include first control information, which may be associated with the first set of system information 210, the UE 115 need not be pre-configured to monitor for the second monitoring window 225 and thus waste device resources monitoring the second monitoring window 225. Rather, the UE 115 may receive the first set of system information 210 that includes configuration information 220, which may indicate when the first UE 115-a is to monitor for the second set of system information 235 (e.g., during the second monitoring windows 225).

Figure 3:
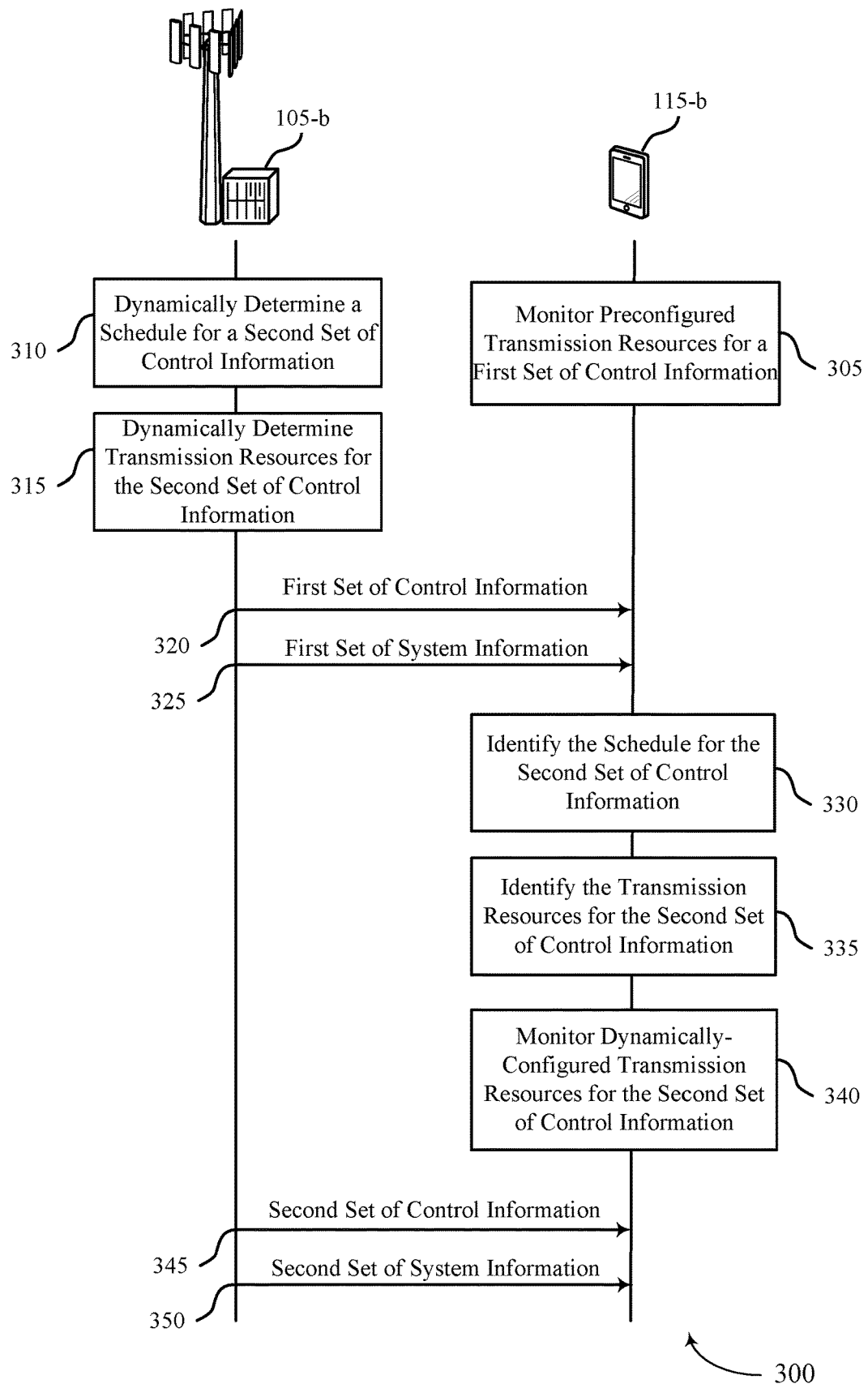
FIG. 3 illustrates an example of a process flow that supports an indication of additional system information in accordance with aspects of the present disclosure.

FIG. 3 illustrates an example of a process flow 300 that supports an indication of additional system information in accordance with various aspects of the present disclosure. In some examples, process flow 300 may be implemented by aspects of wireless communication system 100 or wireless communications system 200. In the example of FIG. 3, process flow 300 may be implemented by a second base station 105-b, which may be an examples of a base station 105 of FIG. 1 or FIG. 2, and a second UE 115-b, which may be an example of a UE 115 of FIG. 1 or FIG. 2.

At 305, the second UE 115-b may monitor a set of preconfigured (e.g., standardized or otherwise known to UE 115-b a priori) transmission resources for a first set of control information, which may be associated with a first set of system information (e.g., RMSI), according to the techniques described herein. For example, the set of monitoring the set of preconfigured transmission resources for the first set of control information may include monitoring the preconfigured transmission resources during one or more preconfigured monitoring windows.

At 310, the second base station 105-b may dynamically determine a transmission schedule for a second set of control information, which may be associated with a second set of system information (e.g., OSI), according to the techniques described herein. For example, dynamically determining the transmission schedule for a second set of control information may include dynamically determining one or more temporal windows during which the second base station 105-b may transmit the second set of control information.

At 315, the second base station 105-b may dynamically determine a set of transmission resources via which the second base station 105-b may transmit the second set of control information according to the techniques described herein. For example, the dynamically-determined set of transmission resources via which the second base station 105-b may transmit the second set of control information may include a CORESET associated with the second set of system information, and the CORESET may have one or more associated search space sets, which may be common to different types or sets of system information or specific to the second set of system information. It is to be understood that the order in process flow 300 is merely exemplary and that, for example, 305, 310, and 315 may occur in any order.

The second base station 105-*b* may transmit, either directionally or in broadcast fashion, the first set of control information 320 according to the techniques described herein. For example, the second base station 105-*b* may transmit the first set of control information 320 during a preconfigured monitoring window and using preconfigured transmission resources.

The second base station 105-*b* may also transmit, either directionally or in broadcast fashion, the first set of system information 325 according to the techniques described herein. For example, the second base station 105-*b* may transmit the firsts set of system information 325 using downlink data transmission resources (e.g., PDSCH resources) indicated by downlink control signaling resources (e.g., PDCCH resources) included within the first set of control information 320. Further, the first set of system information 325 may include configuration information indicative of the transmission schedule and transmission resources that the second base station 105-*b* dynamically determined at 310 and 315 respectively. The second base station 105-*b* may transmit the first set of system information 325 simultaneously with, after, or within some amount of time prior to (e.g., an amount of time supported by a buffer at the second UE 115-*b*) transmitting the first set of control information 320.

At 330, having received the first set of control information 320 and the first set of system information 325, the second UE 115-*b* may identify the transmission schedule that was dynamically determined by the second base station 105-*b* at 310 according to the techniques described herein. For example, the second UE 115-*b* may identify the transmission schedule based at least in part on configuration information included in the first set of system information 325.

At 335, the second UE 115-*b* may identify the transmission resources that were dynamically determined by the second base station 105-*b* at 315 according to the techniques described herein. For example, the second UE 115-*b* may identify the transmission resources based at least in part on configuration information included in the first set of system information 325.

At 340, the second UE 115-*b* may monitor the set of dynamically-determined transmission resources that the second UE 115-*b* identified at 335 according to the techniques described herein. For example, the second UE 115-*b* may monitor the set of dynamically-determined transmission resources for the second set of control information during monitoring windows corresponding to the schedule that the second UE 115-*b* identified at 330.

The second base station 105-*b* may transmit, either directionally or in broadcast fashion, the second set of control information 345 according to the techniques described herein. For example, the second base station 105-*b* may transmit the second set of control information 345 according to the transmission schedule and via the transmission resources that the second base station 105-*b* dynamically determined at 310 and 315 respectively. Further, as described herein, the second base station 105-*b* may encode some or all of the second set of control information 345 using an RNTI that is the same as or different than an RNTI with which the second base station 105-*b* may have encoded some or all of the first set of control information 320.

The second base station 105-*b* may also transmit, either directionally or in broadcast fashion, the second set of system information 350 according to the techniques described herein. For example, the second base station 105-*b* may transmit the second set of system information 350 using downlink data transmission resources (e.g., PDSCH resources) indicated by downlink control signaling resources (e.g., PDCCH resources) included within the second set of control information 345. The second base station 105-*b* may transmit the second set of system information 350 simultaneously with, after, or within some amount of time prior to (e.g., an amount of time supported by a buffer at the second UE 115-*b*) transmitting the second set of control information 345.

The second UE 115-*b* may receive the second set of control information 345 and receive the second set of system information 350 via one or more transmission resources indicated by the second set of control information 345.

Figure 4:
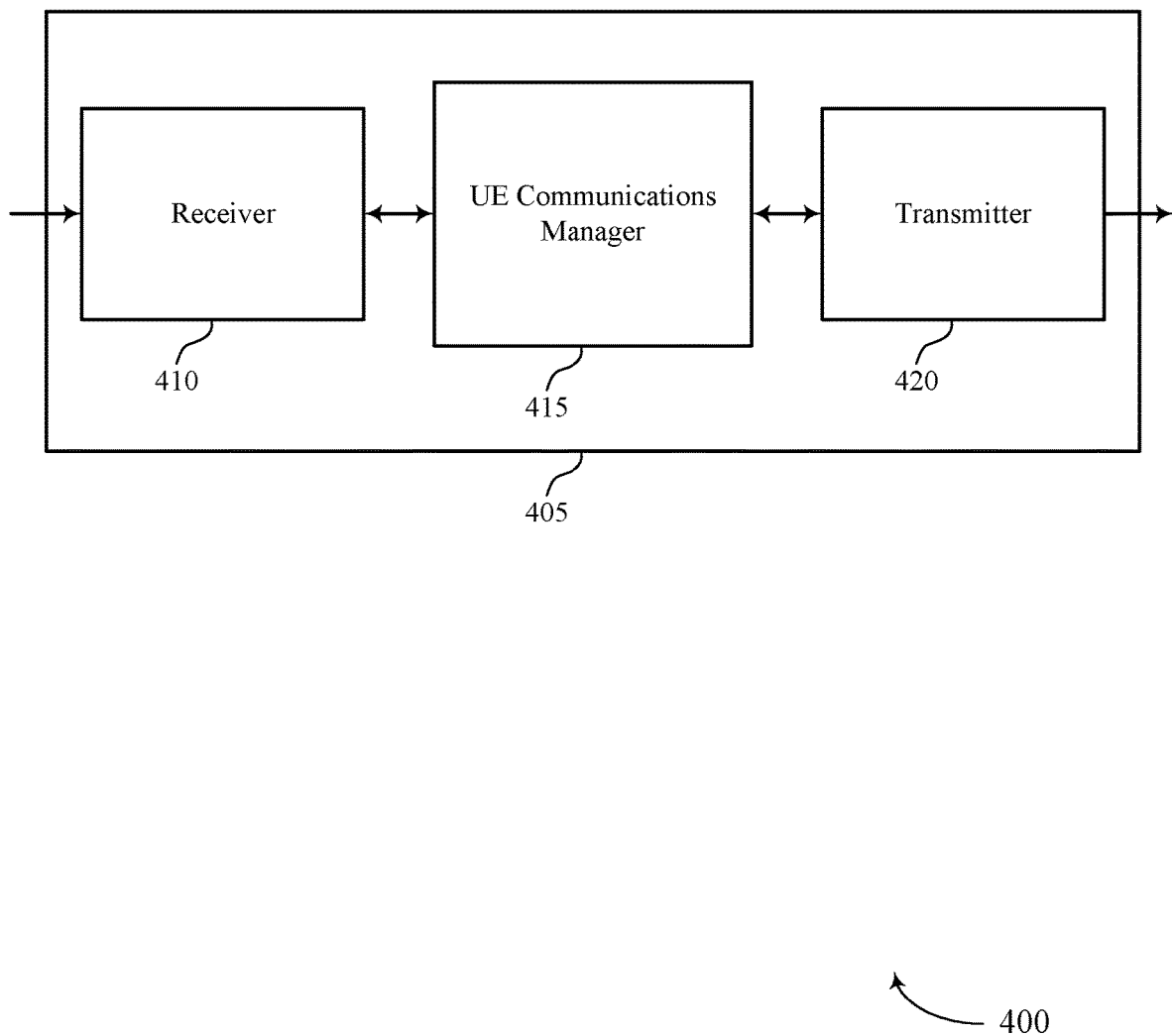
FIGS. 4 through 6 show block diagrams of a device that supports an indication of additional system information in accordance with aspects of the present disclosure.

FIG. 4 shows a block diagram 400 of a wireless device 405 that supports an indication of additional system information in accordance with aspects of the present disclosure. Wireless device 405 may be an example of aspects of a user equipment (UE) 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to indication of additional system information, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7.

UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive a first set of system information, where the first set of system information includes configuration information associated with a second set of system information, identify, based on the configuration information, one or more temporal windows during which to monitor for control information associated with the second set of system information, identify, based on the configuration information, a set of dynamically-configured transmission resources within the identified one or more temporal windows to monitor for the control information associated with the second set of system information, and monitor the identified set of transmission resources during at least one identified temporal window.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
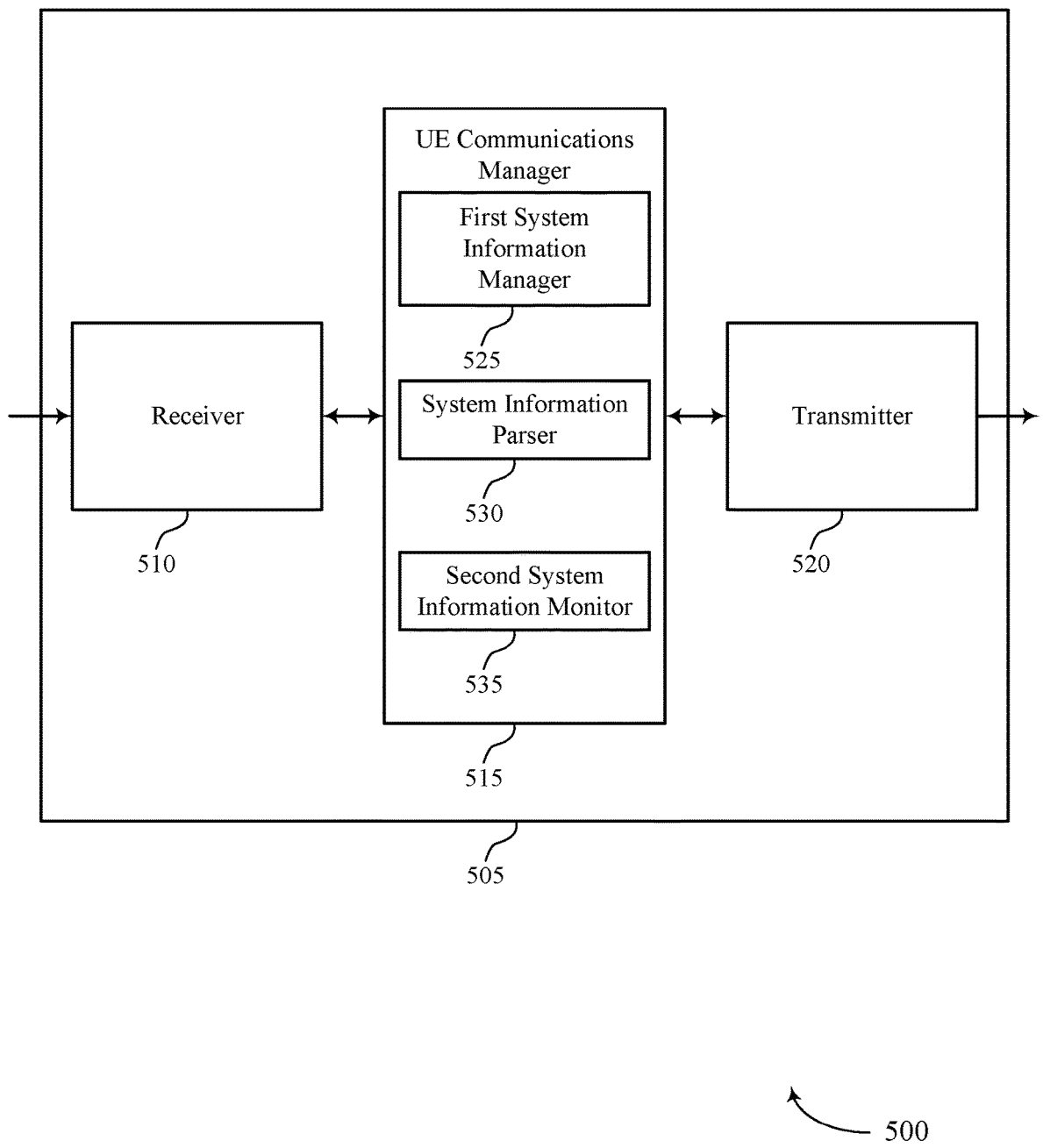

FIG. 5 shows a block diagram 500 of a wireless device 505 that supports an indication of additional system information in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to indication of additional system information, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7.

UE communications manager 515 may also include first system information manager 525, system information parser 530, and second system information monitor 535.

First system information manager 525 may receive a first set of system information, where the first set of system information includes configuration information associated with a second set of system information. In some cases, the first set of system information includes RMSI data.

System information parser 530 may identify, based on the configuration information, one or more temporal windows during which to monitor for control information associated with the second set of system information and identify, based on the configuration information, a set of dynamically-configured transmission resources within the identified one or more temporal windows to monitor for the control information associated with the second set of system information. In some cases, identifying, based on the configuration information, the set of dynamically-configured transmission resources to monitor for control information associated with the second set of system information includes identifying a CORESET and/or a search space set corresponding to the second set of system information. In some cases, the configuration information indicates a beam index associated with the set of transmission resources. In some cases, the configuration information indicates a frame index associated with the set of transmission resources, a slot index associated with the set of transmission resources, a subframe index associated with the set of transmission resources, a symbol index associated with the set of transmission resources, or any combination thereof. In some cases, the configuration information indicates a frequency band associated with the set of transmission resources. In some cases, the configuration information indicates a RNTI associated with the set of transmission resources. In some cases, the RNTI associated with the set of transmission resources is different than another RNTI associated with the first set of system information. In some cases, the RNTI associated with the set of transmission resources is also associated with the first set of system information.

Second system information monitor 535 may monitor the identified set of transmission resources during at least one identified temporal window and receive the control information associated with the second set of system information via the identified set of transmission resources. In some cases, monitoring the identified set of transmission resources during the at least one identified temporal window includes monitoring a search space associated with the CORESET for control information corresponding to the second set of system information.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
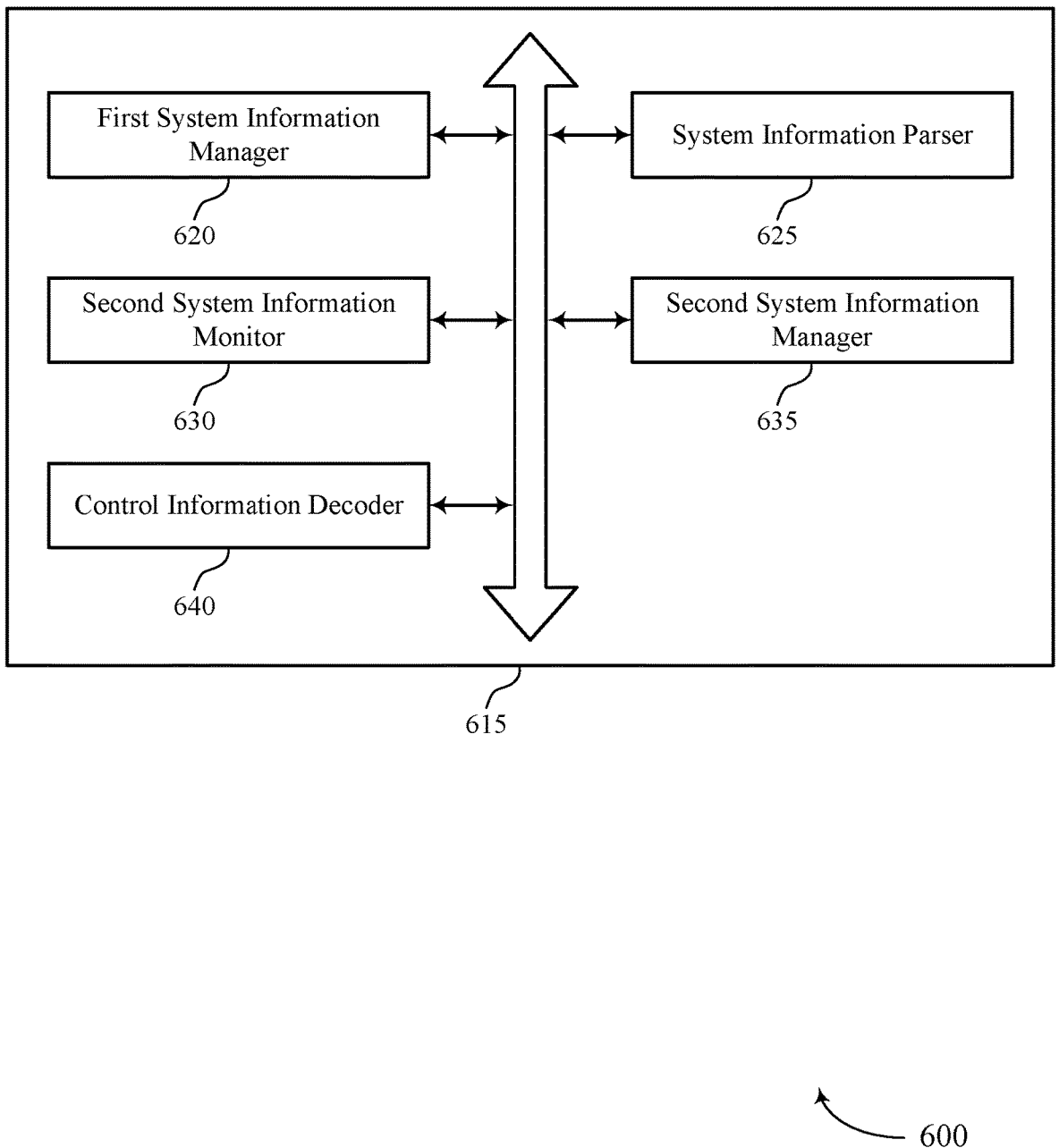

FIG. 6 shows a block diagram 600 of a UE communications manager 615 that supports an indication of additional system information in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include first system information manager 620, system information parser 625, second system information monitor 630, second system information manager 635, and control information decoder 640. Each of these modules may communicate, directly or indirectly, with one another (e.g., via one or more buses).

First system information manager 620 may receive a first set of system information, where the first set of system information includes configuration information associated with a second set of system information. In some cases, the first set of system information includes RMSI data.

System information parser 625 may identify, based on the configuration information, one or more temporal windows during which to monitor for control information associated with the second set of system information and identify, based on the configuration information, a set of dynamically-configured transmission resources within the identified one or more temporal windows to monitor for the control information associated with the second set of system information. In some cases, identifying, based on the configuration information, the set of dynamically-configured transmission resources to monitor for control information associated with the second set of system information includes identifying a CORESET and/or a search space set corresponding to the second set of system information.

In some cases, the configuration information indicates a beam index associated with the set of transmission resources. In some cases, the configuration information indicates a frame index associated with the set of transmission resources, a slot index associated with the set of transmission resources, a subframe index associated with the set of transmission resources, a symbol index associated with the set of transmission resources, or any combination thereof. In some cases, the configuration information indicates a frequency band associated with the set of transmission resources. In some cases, the configuration information indicates a RNTI associated with the set of transmission resources. In some cases, the RNTI associated with the set of transmission resources is different than another RNTI associated with the first set of system information. In some cases, the RNTI associated with the set of transmission resources is also associated with the first set of system information.

Second system information monitor 630 may monitor the identified set of transmission resources during at least one identified temporal window and receive the control information associated with the second set of system information via the identified set of transmission resources. In some cases, monitoring the identified set of transmission resources during the at least one identified temporal window includes monitoring a search space set associated with the CORESET for control information corresponding to the second set of system information.

Second system information manager 635 may receive the second set of system information via a transmission resource indicated by the identified the control information. In some cases, the second set of system information includes OSI data.

Control information decoder 640 may decode control information using one or more RNTIs. In some cases, monitoring the identified set of transmission resources during the at least one identified temporal window includes determining whether control information received via the identified set of transmission resources has been encoded at least in part with a RNTI corresponding to the second set of system information.

Figure 7:
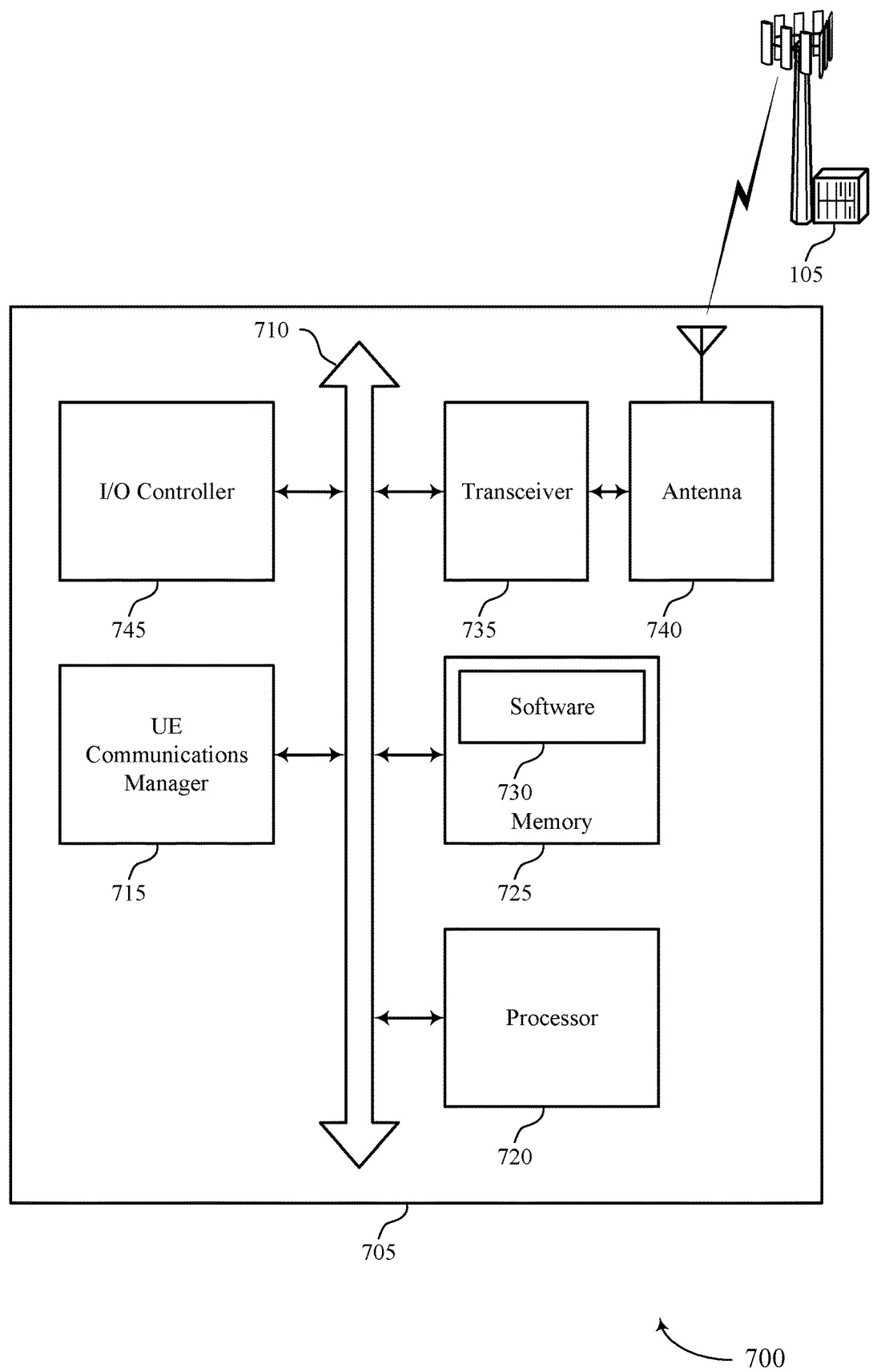
FIG. 7 illustrates a block diagram of a system including a UE that supports an indication of additional system information in accordance with aspects of the present disclosure.

FIG. 7 shows a diagram of a system 700 including a device 705 that supports an indication of additional system information in accordance with aspects of the present disclosure. Device 705 may be an example of or include the components of wireless device 405, wireless device 505, or a UE 115 as described herein, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting indication of additional system information).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support indication of additional system information. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described herein. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
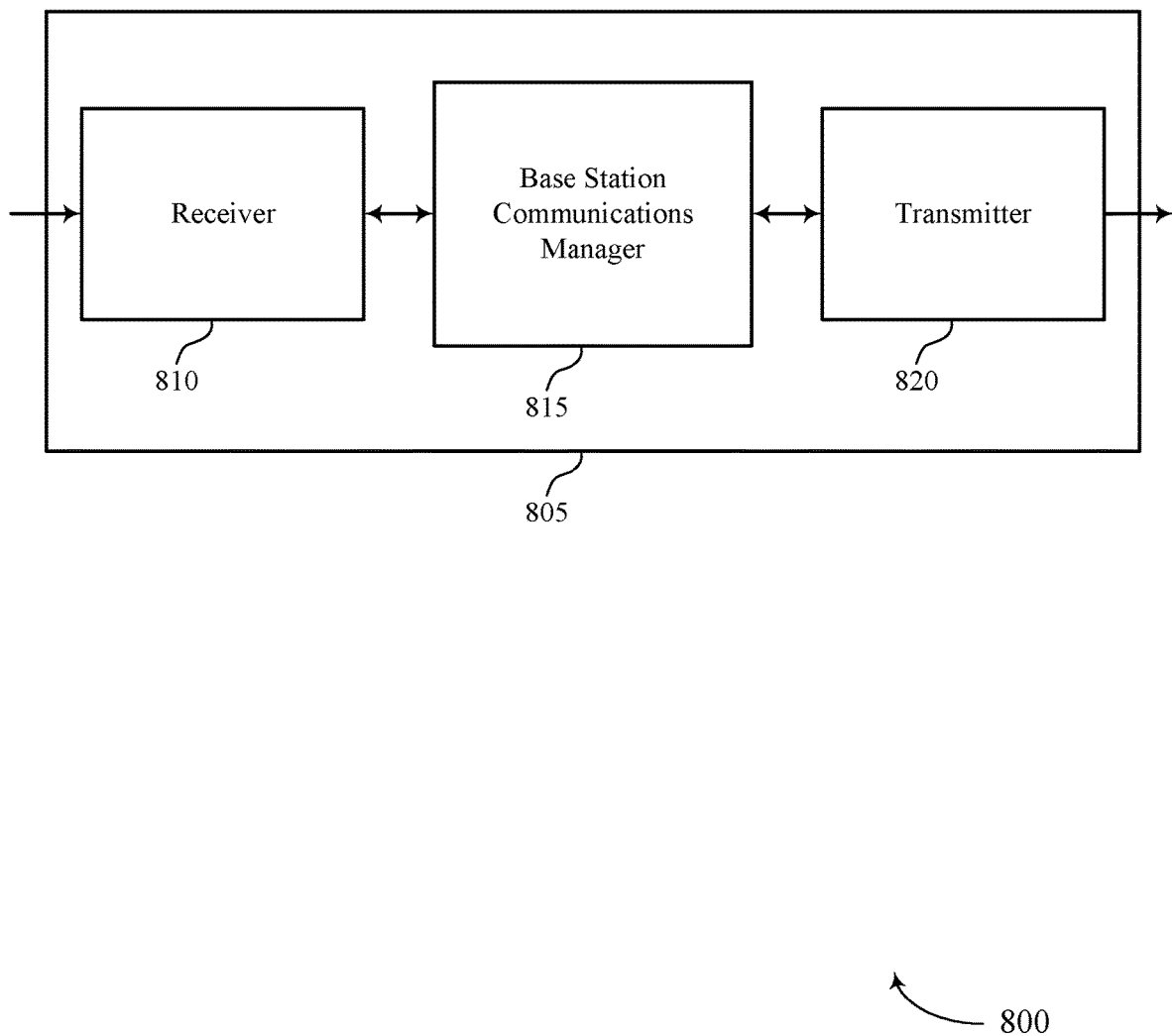
FIGS. 8 through 10 show block diagrams of a device that supports an indication of additional system information in accordance with aspects of the present disclosure.

FIG. 8 shows a block diagram 800 of a wireless device 805 that supports an indication of additional system information in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to indication of additional system information, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11.

Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may determine one or more temporal windows for transmitting control information for a second set of system information, determine a set of dynamically-configured transmission resources for transmitting the control information for the second set of system information during the one or more temporal windows, and transmit a first set of system information, where the first set of system information includes configuration information indicative of the one or more temporal windows and of the set of dynamically-configured transmission resources.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
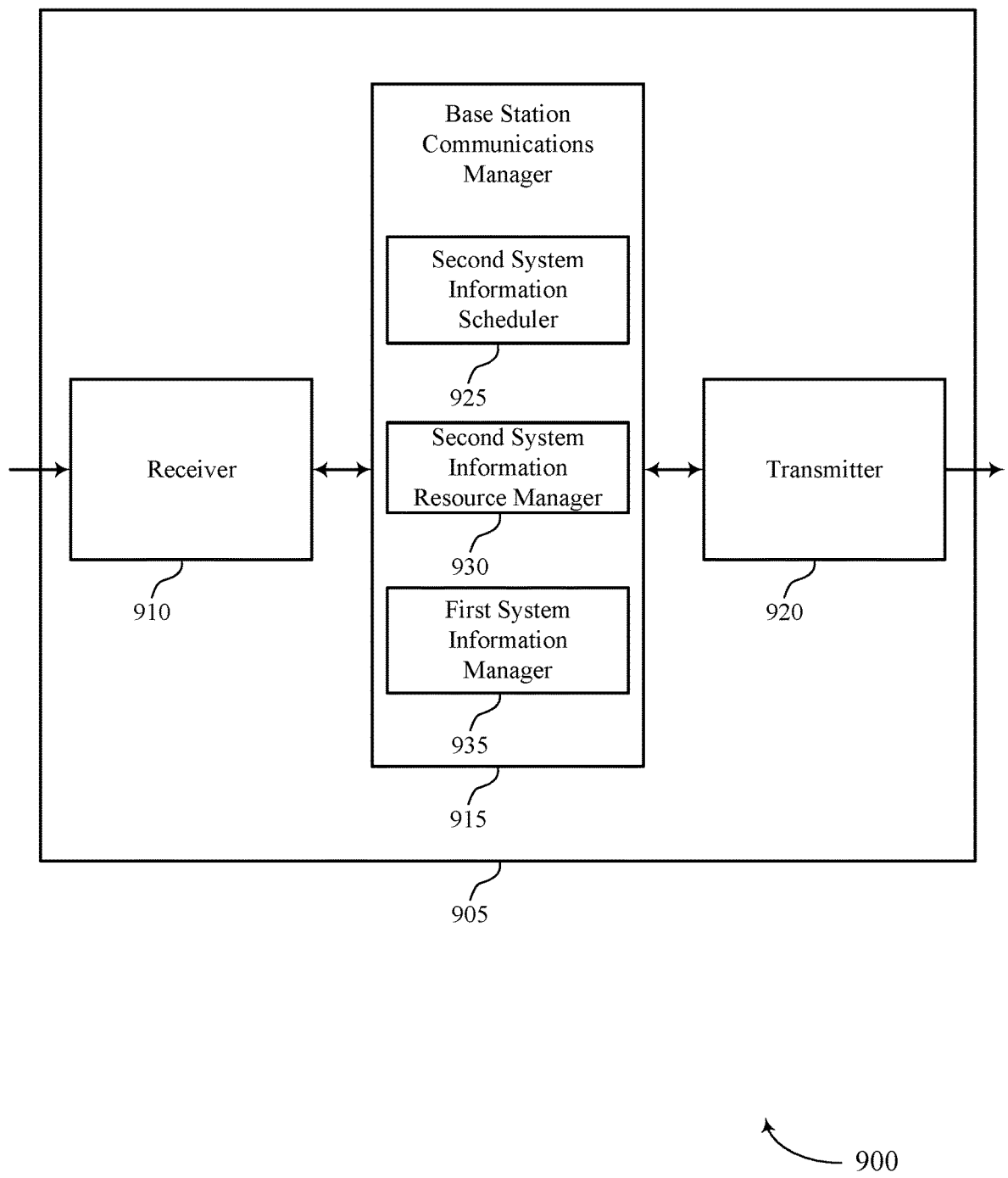

FIG. 9 shows a block diagram 900 of a wireless device 905 that supports an indication of additional system information in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to indication of additional system information, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11.

Base station communications manager 915 may also include second system information scheduler 925, second system information resource manager 930, and first system information manager 935.

Second system information scheduler 925 may determine one or more temporal windows for transmitting control information for a second set of system information. In some cases, determining the one or more temporal windows for transmitting the second set of system information includes determining a time duration for each of the one or more temporal windows. In some cases, determining the one or more temporal windows for potentially transmitting the second set of system information includes determining a periodicity for the one or more temporal windows. In some cases, determining the one or more temporal windows for potentially transmitting the second set of system information includes determining an initial symbol index for each of the one or more temporal windows. In some cases, at least one of the one or more temporal windows for potentially transmitting the second set of system information overlaps at least in part with a temporal window for potentially transmitting the first set of system information.

Second system information resource manager 930 may determine a set of dynamically-configured transmission resources for transmitting the control information for the second set of system information during the one or more temporal windows. In some cases, determining the set of dynamically-configured transmission resources for transmitting the control information for the second set of system information during the one or more temporal windows includes determining a CORESET and/or a search space set corresponding to the second set of system information. In some cases, the CORESET is associated with a set of search spaces.

First system information manager 935 may transmit a first set of system information, where the first set of system information includes configuration information indicative of the one or more temporal windows and of the set of dynamically-configured transmission resources. In some cases, the first set of system information includes RMSI data.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
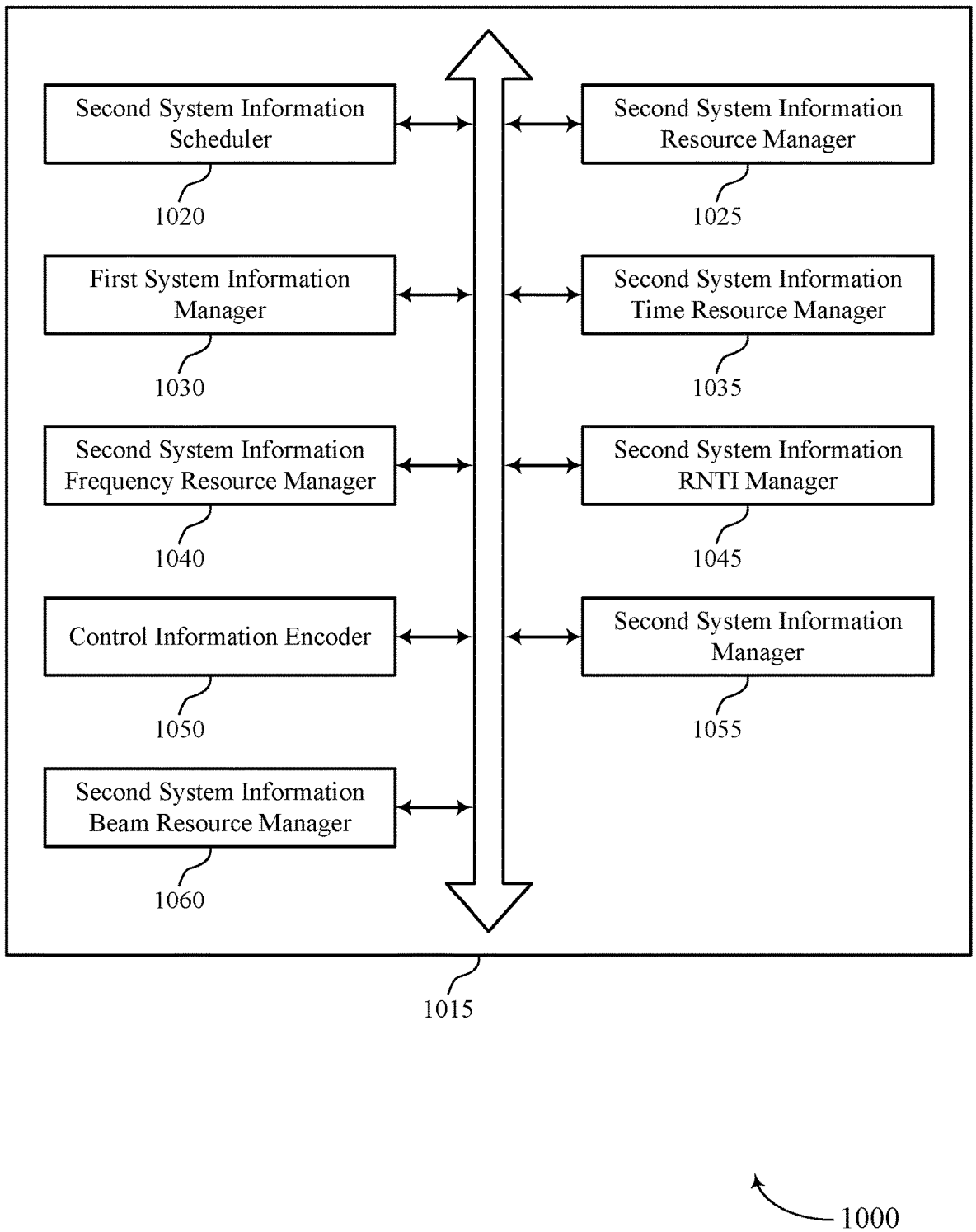

FIG. 10 shows a block diagram 1000 of a base station communications manager 1015 that supports an indication of additional system information in accordance with aspects of the present disclosure. The base station communications manager 1015 may be an example of aspects of a base station communications manager 1115 described with reference to FIGS. 8, 9, and 11. The base station communications manager 1015 may include second system information scheduler 1020, second system information resource manager 1025, first system information manager 1030, second system information time resource manager 1035, second system information frequency resource manager 1040, second system information RNTI manager 1045, control information encoder 1050, second system information manager 1055, and second system information beam resource manager 1060. Each of these modules may communicate, directly or indirectly, with one another (e.g., via one or more buses).

Second system information scheduler 1020 may determine one or more temporal windows for transmitting control information for a second set of system information. In some cases, determining the one or more temporal windows for transmitting the second set of system information includes determining a time duration for each of the one or more temporal windows. In some cases, determining the one or more temporal windows for potentially transmitting the second set of system information includes determining a periodicity for the one or more temporal windows. In some cases, determining the one or more temporal windows for potentially transmitting the second set of system information includes determining an initial symbol index for each of the one or more temporal windows. In some cases, at least one of the one or more temporal windows for potentially transmitting the second set of system information overlaps at least in part with a temporal window for potentially transmitting the first set of system information.

Second system information resource manager 1025 may determine a set of dynamically-configured transmission resources for transmitting the control information for the second set of system information during the one or more temporal windows. In some cases, determining the set of dynamically-configured transmission resources for transmitting the control information for the second set of system information during the one or more temporal windows includes determining a CORESET and/or a search space set corresponding to the second set of system information. In some cases, the CORESET is associated with a set of search spaces.

First system information manager 1030 may transmit a first set of system information, where the first set of system information includes configuration information indicative of the one or more temporal windows and of the set of dynamically-configured transmission resources. In some cases, the first set of system information includes RMSI data.

Second system information time resource manager 1035 may determine a symbol index associated with the second set of system information, which may be different than another symbol index associated with the first set of system information. In some cases, however, second system information time resource manager 1035 may determine a symbol index associated with the second set of system information, which may also be associated with the first set of system information. In some cases, determining the set of dynamically-configured transmission resources for transmitting the control information for the second set of system information during the one or more temporal windows includes determining a slot index associated with the second set of system information, the slot index different than another slot index associated with the first set of system information.

In some cases, determining the set of dynamically-configured transmission resources for transmitting the control information for the second set of system information during the one or more temporal windows includes determining a slot index associated with the second set of system information, the slot index also associated with the first set of system information. In some cases, determining the set of dynamically-configured transmission resources for transmitting the control information for the second set of system information during the one or more temporal windows includes determining a slot index associated with the second set of system information, the slot index also associated with the first set of system information. In some cases, the configuration information includes an indication of a frame index associated with the set of transmission resources, a subframe index associated with the set of transmission resources, a symbol index associated with the set of transmission resources, or any combination thereof.

Second system information frequency resource manager 1040 may determine a frequency band associated with the second set of system information, the frequency band different than another frequency band associated with the first set of system information. In some cases, the frequency band partially overlaps with the another frequency band. In some cases, the configuration information includes an indication of a frequency band for the set of transmission resources.

Second system information RNTI manager 1045 may assign a RNTI to the first set of system information, the RNTI different than another RNTI associated with the second set of system information and assign a same RNTI to the first set of system information and to the second set of system information.

Control information encoder 1050 may encode control information for the first set of system information with a first RNTI and encode the control information for the second set of system information with a second RNTI.

Second system information manager 1055 may transmit the control information for the second set of system information during at least one of the temporal windows. In some cases, the second set of system information includes OSI data.

Second system information beam resource manager 1060 may determine one or more beams via which to transmit the second set of transmission resources. In some cases, the configuration information includes an indication of a beam index for the set of transmission resources.

Figure 11:
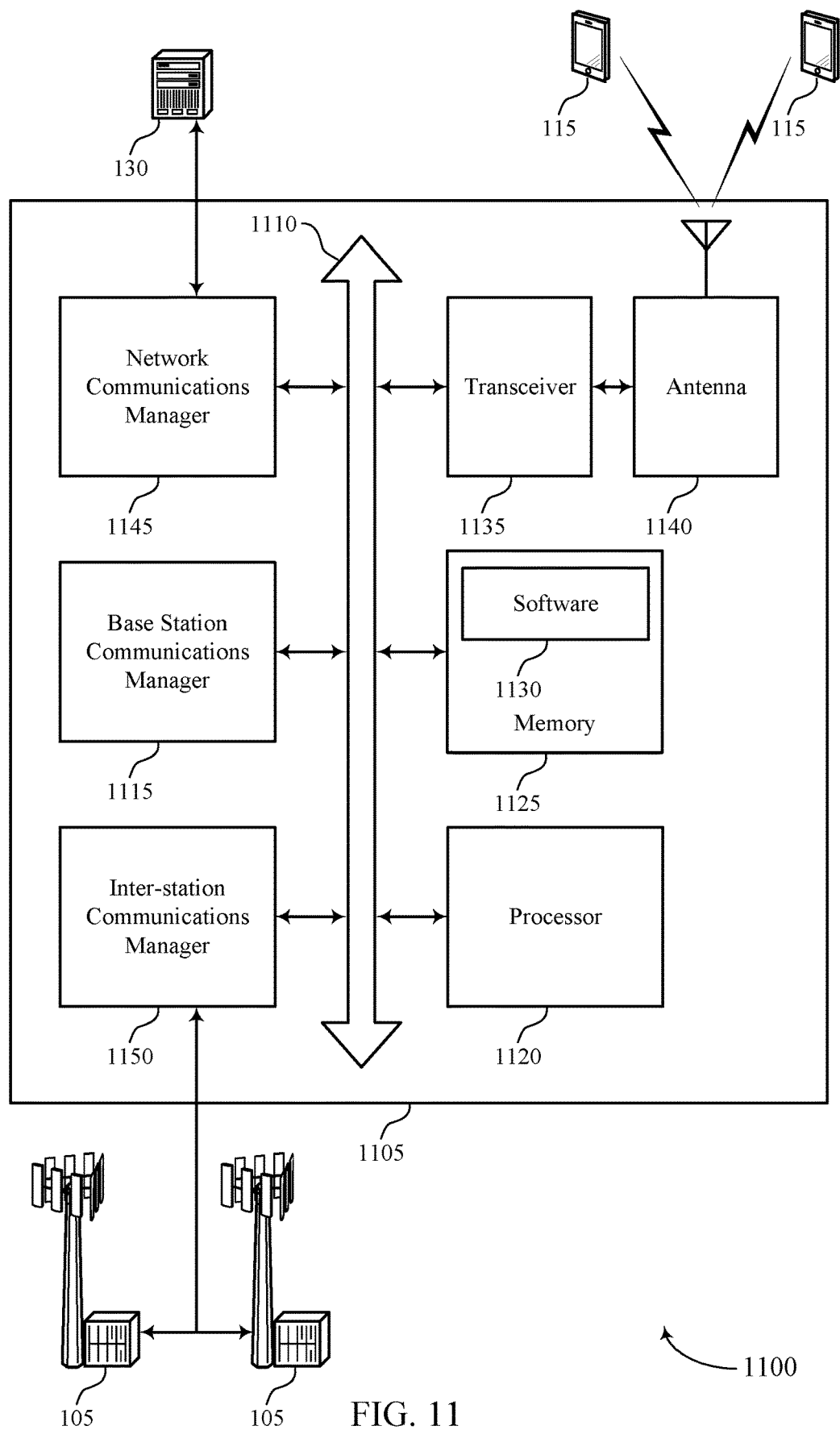
FIG. 11 illustrates a block diagram of a system including a base station that supports an indication of additional system information in accordance with aspects of the present disclosure.

FIG. 11 shows a diagram of a system 1100 including a device 1105 that supports an indication of additional system information in accordance with aspects of the present disclosure. Device 1105 may be an example of or include the components of base station 105 as described herein, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting indication of additional system information).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support indication of additional system information. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an Long Term Evolution (LTE)/LTE-A wireless communication network technology to provide communication between base stations 105.

Figure 12:
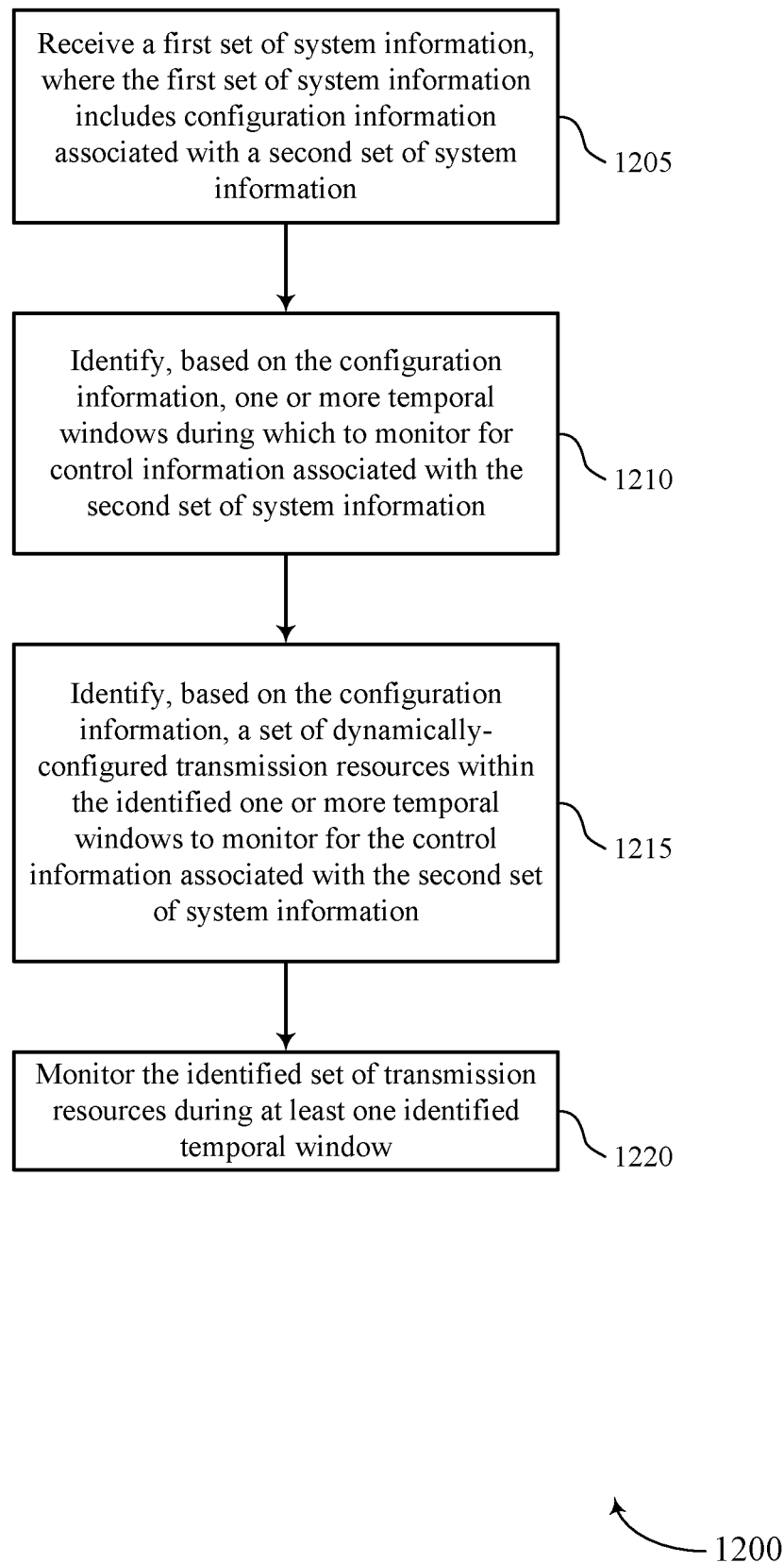
FIGS. 12 through 13 illustrate methods for an indication of additional system information in accordance with aspects of the present disclosure.

FIG. 12 shows a flowchart illustrating a method 1200 for an indication of additional system information in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1205 the UE 115 may receive a first set of system information, the first set of system information includes configuration information associated with a second set of system information. The operations of 1205 may be performed according to the methods described herein. In certain examples, aspects of the operations of 1205 may be performed by a first system information manager as described with reference to FIGS. 4 through 7.

At 1210 the UE 115 may identify, based at least in part on the configuration information, one or more temporal windows during which to monitor for control information associated with the second set of system information. The operations of 1210 may be performed according to the methods described herein. In certain examples, aspects of the operations of 1210 may be performed by a system information parser as described with reference to FIGS. 4 through 7.

At 1215 the UE 115 may identify, based at least in part on the configuration information, a set of dynamically-configured transmission resources within the identified one or more temporal windows to monitor for the control information associated with the second set of system information. The operations of 1215 may be performed according to the methods described herein. In certain examples, aspects of the operations of 1215 may be performed by a system information parser as described with reference to FIGS. 4 through 7.

At 1220 the UE 115 may monitor the identified set of transmission resources during at least one identified temporal window. The operations of 1220 may be performed according to the methods described herein. In certain examples, aspects of the operations of 1220 may be performed by a second system information monitor as described with reference to FIGS. 4 through 7.

Figure 13:
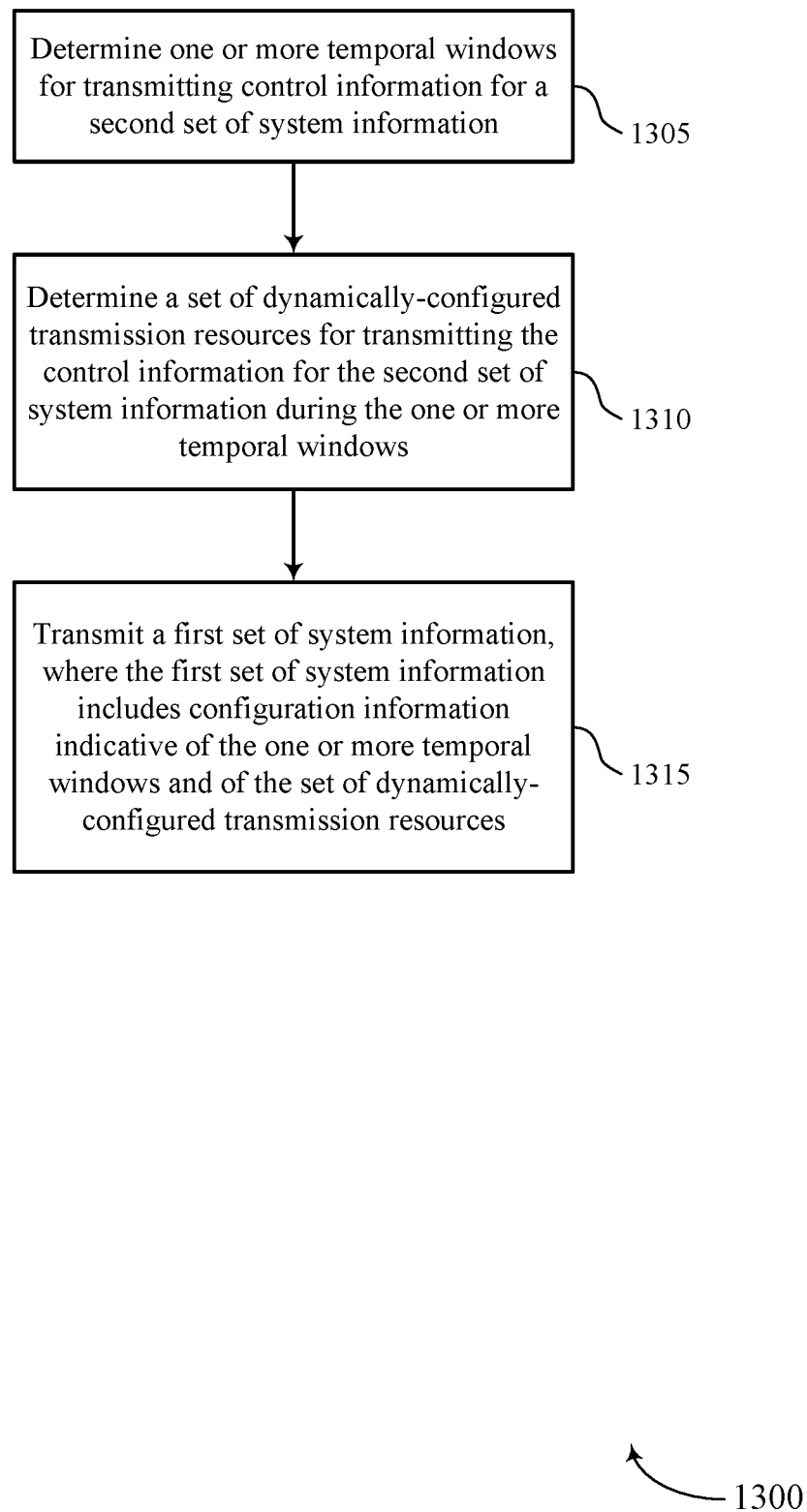

FIG. 13 shows a flowchart illustrating a method 1300 for an indication of additional system information in accordance with aspects of the present disclosure. The operations of method 1300 may be implemented by a base station 105 or its components as described herein. For example, the operations of method 1300 may be performed by a base station communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1305 the base station 105 may determine one or more temporal windows for transmitting control information for a second set of system information. The operations of 1305 may be performed according to the methods described herein. In certain examples, aspects of the operations of 1305 may be performed by a second system information scheduler as described with reference to FIGS. 8 through 11.

At 1310 the base station 105 may determine a set of dynamically-configured transmission resources for transmitting the control information for the second set of system information during the one or more temporal windows. The operations of 1310 may be performed according to the methods described herein. In certain examples, aspects of the operations of 1310 may be performed by a second system information resource manager as described with reference to FIGS. 8 through 11.

At 1315 the base station 105 may transmit a first set of system information, the first set of system information includes configuration information indicative of the one or more temporal windows and of the set of dynamically-configured transmission resources. The operations of 1315 may be performed according to the methods described herein. In certain examples, aspects of the operations of 1315 may be performed by a first system information manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a first set of system information, wherein the first set of system information includes configuration information associated with a second set of system information;
identifying, based at least in part on the configuration information of the first set of system information, one or more temporal windows during which to monitor for control information associated with the second set of system information;
identifying, based at least in part on the configuration information of the first set of system information, a set of dynamically-configured transmission resources within the identified one or more temporal windows, the dynamically-configured transmission resources comprising dynamically-configured frequency resources for monitoring for the control information associated with the second set of system information; and
monitoring the identified set of dynamically-configured transmission resources during at least one identified temporal window.

2. The method of claim 1, further comprising:
receiving the control information associated with the second set of system information via the identified set of dynamically-configured transmission resources; and
receiving the second set of system information via a transmission resource indicated by the identified the control information.

3. The method of claim 1, wherein identifying, based at least in part on the configuration information, the set of dynamically-configured transmission resources to monitor for the control information associated with the second set of system information comprises:
identifying a control resource set (CORESET), a search space set, or a combination thereof corresponding to the second set of system information.

4. The method of claim 3, wherein monitoring the identified set of dynamically-configured transmission resources during the at least one identified temporal window comprises:
monitoring the search space set associated with the CORESET for the control information corresponding to the second set of system information.

5. The method of claim 1, wherein monitoring the identified set of dynamically-configured transmission resources during the at least one identified temporal window comprises:
determining whether the control information received via the identified set of dynamically-configured transmission resources has been encoded at least in part with a radio network temporary identifier (RNTI) corresponding to the second set of system information.

6. The method of claim 1, wherein the configuration information indicates, a frame index associated with the set of dynamically-configured transmission resources, a slot index associated with the set of dynamically-configured transmission resources, a subframe index associated with the set of dynamically-configured transmission resources, a symbol index associated with the set of dynamically-configured transmission resources, a frequency band associated with the set of dynamically-configured transmission resources, a radio network temporary identifier (RNTI) associated with the set of dynamically-configured transmission resources, or any combination thereof.

7. The method of claim 6, wherein the RNTI associated with the set of dynamically-configured transmission resources is different than another RNTI associated with the first set of system information.

8. The method of claim 6, wherein the RNTI associated with the set of dynamically-configured transmission resources is also associated with the first set of system information.

9. The method of claim 1, wherein the second set of system information comprises other system information (OSI) data.

10. The method of claim 1, wherein the first set of system information comprises remaining minimum system information (RMSI) data.

11. A method for wireless communication, comprising:
determining one or more temporal windows for transmitting control information for a second set of system information;
determining a set of dynamically-configured transmission resources for transmitting the control information for the second set of system information during the one or more temporal windows, the dynamically-configured transmission resources comprising dynamically-configured frequency resources for transmitting the control information for the second set of system information; and transmitting a first set of system information, wherein the first set of system information includes configuration information indicative of the one or more temporal windows and of the set of dynamically-configured frequency resources.

12. The method of claim 11, wherein determining the set of dynamically-configured transmission resources for transmitting the control information for the second set of system information during the one or more temporal windows comprises:

determining a control resource set (CORESET), a search space set, or a combination thereof corresponding to the second set of system information.

13. The method of claim 11, wherein determining the set of dynamically-configured transmission resources for transmitting the control information for the second set of system information during the one or more temporal windows comprises:

determining a slot index associated with the second set of system information, the slot index different than another slot index associated with the first set of system information.

14. The method of claim 11, wherein determining the set of dynamically-configured transmission resources for transmitting the control information for the second set of system information during the one or more temporal windows comprises:

determining a slot index associated with the second set of system information, the slot index also associated with the first set of system information; and determining a symbol index associated with the second set of system information, the symbol index different than another symbol index associated with the first set of system information.

15. The method of claim 11, wherein determining the set of dynamically-configured transmission resources for transmitting the control information for the second set of system information during the one or more temporal windows comprises:

determining a slot index associated with the second set of system information, the slot index also associated with the first set of system information;

determining a symbol index associated with the second set of system information, the symbol index also associated with the first set of system information; and determining a frequency band associated with the second set of system information, the frequency band different than another frequency band associated with the first set of system information.

16. The method of claim 11, wherein the frequency band partially overlaps with another frequency band.

17. The method of claim 11, further comprising:

assigning a radio network temporary identifier (RNTI) to the first set of system information, the RNTI different than another RNTI associated with the second set of system information.

18. The method of claim 11, further comprising:

assigning a same radio network temporary identifier (RNTI) to the first set of system information and to the second set of system information.

19. The method of claim 11, wherein determining the one or more temporal windows for transmitting the second set of system information comprises:

determining a time duration for each of the one or more temporal windows;

determining a periodicity for the one or more temporal windows; and determining an initial symbol index for each of the one or more temporal windows.

20. An apparatus for wireless communication, comprising:

a processor;
memory in electronic communication with the processor; and
instructions stored in the memory and executable by the processor to cause the apparatus to:
receive a first set of system information, wherein the first set of system information includes configuration information associated with a second set of system information;
identify, based at least in part on the configuration information of the first set of system information, one or more temporal windows during which to monitor for control information associated with the second set of system information;
identify, based at least in part on the configuration information of the first set of system information, a set of dynamically-configured transmission resources within the identified one or more temporal windows, the dynamically-configured transmission resources comprising dynamically-configured frequency resources for monitoring for the control information associated with the second set of system information; and
monitor the identified set of dynamically-configured transmission resources during at least one identified temporal window.

* * * * *